F. PFEIFER.
WEIGHT MOTOR.
APPLICATION FILED MAR. 2, 1912.
1,050,231.
Patented Jan. 14, 1913.
2 SHEETS—SHEET 1.
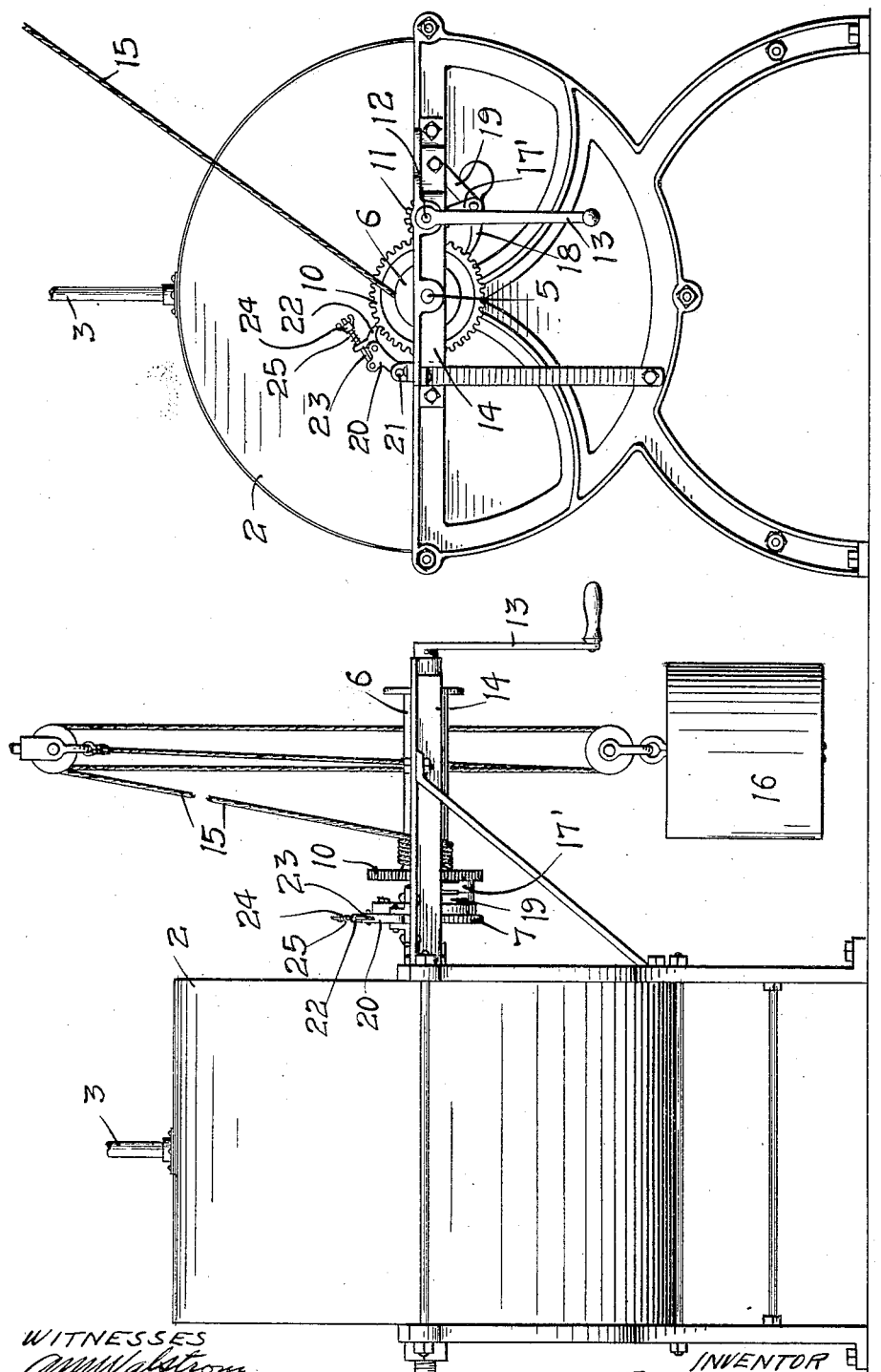
WITNESSES
INVENTOR
FRANK PFEIFER
BY
ATTORNEYS

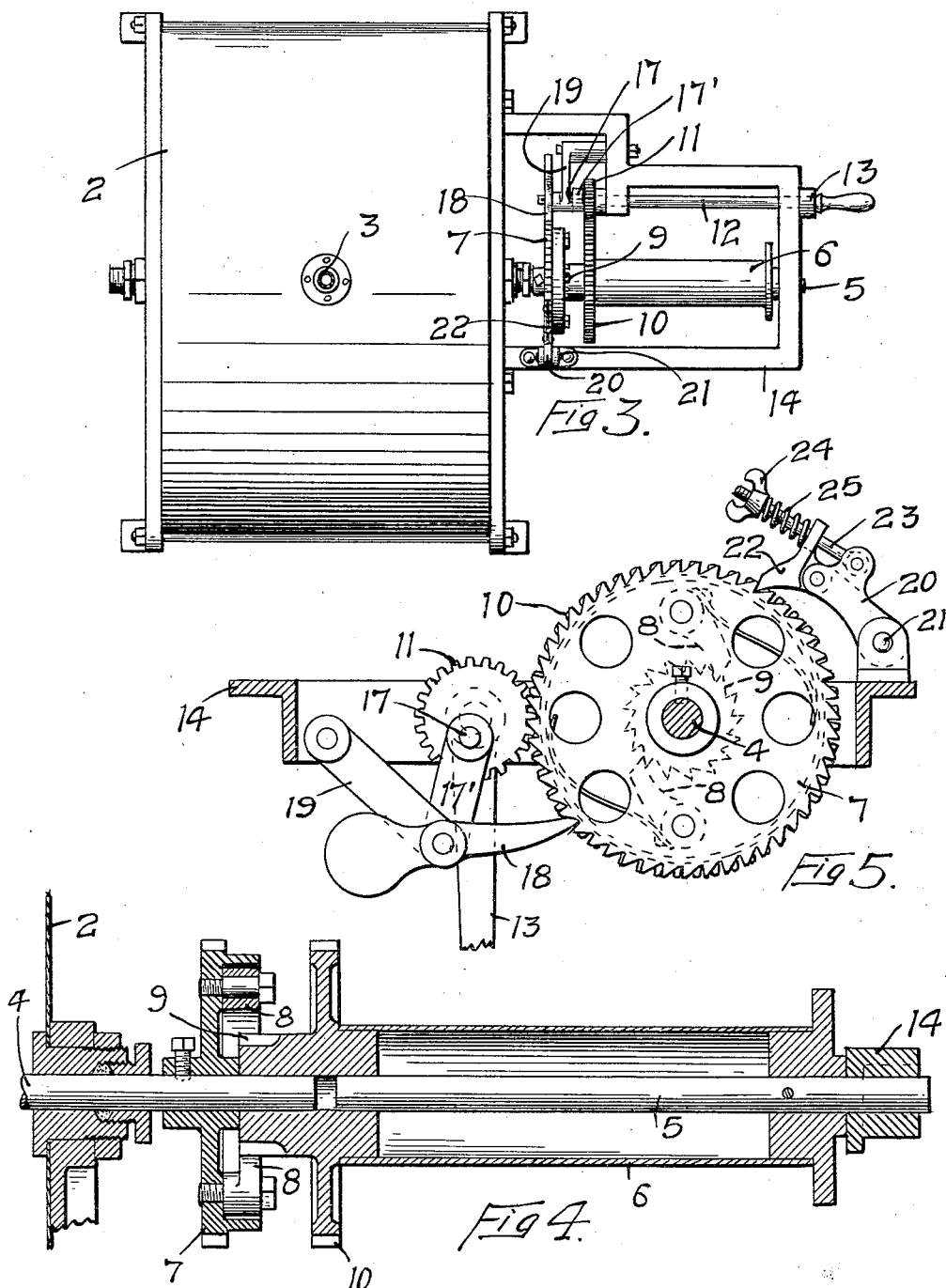

UNITED STATES PATENT OFFICE.

FRANK PFEIFER, OF EXCELSIOR, MINNESOTA, ASSIGNOR TO MINNEAPOLIS GAS MACHINE COMPANY, OF MINNEAPOLIS, MINNESOTA, A CORPORATION.

WEIGHT-MOTOR.

1,050,231.  Specification of Letters Patent.  Patented Jan. 14, 1913.

Application filed March 2, 1912. Serial No. 681,263.

*To all whom it may concern:*

Be it known that I, FRANK PFEIFER, of Excelsior, Hennepin county, Minnesota, have invented certain new and useful Improvements in Weight-Motors, of which the following is a specification.

This invention relates to a blowing apparatus for use in connection with a gas-lighting system.

The primary object of the invention is to provide a mechanism which will allow a continuous, uniform pressure in the system during the period that the cable connected with the weight for operating the blower is being wound up.

A further object is to provide an operating mechanism which will not require the movement of clutches or other devices preliminary to winding up the operating cable.

Other objects of the invention will appear from the following detailed description.

The invention consists generally in various constructions and combinations, all as hereinafter described and particularly pointed out in the claims.

In the accompanying drawings forming part of this specification, Figure 1 is a side elevation of a blower embodying my invention, Fig. 2 is an end view of the same, Fig. 3 is a plan view, Fig. 4 is a detail sectional view, showing the winding mechanism for the cable drum, Fig. 5 is a detail view illustrating the means for maintaining a uniform pressure in the system.

In the drawing, 2 represents the casing of the blower, having a pipe 3 leading to the system. I make no claim to the mechanism of the blower itself and do not, therefore, illustrate it in detail herein.

4 is the blower shaft and 5 a shaft in line therewith, on which the cable drum 6 is mounted. A ratchet wheel 7 is secured on the shaft 4 and provided with a series of dogs 8 adapted to engage the teeth 9 on the end of the drum hub. A gear 10 is provided on one end of the drum, meshing with a pinion 11 on a shaft 12 provided with a winding crank 13. The drum shaft and the shaft 12 are mounted in bearings in a frame 14 and a cable 15 is attached at one end to said drum and carries an operating weight 16. The pull of this operating weight is transmitted through the drum, the teeth 9, the dogs 8, and the ratchet wheel of the blower shaft 4 to operate the blower, and the winding of the cable on the drum is accomplished through the revolution of the shaft 12, the pinion 11 and the gear 10.

To prevent the blower from becoming stationary during the operation of winding the cable, I mount a crank pin 17 on the pinion 11 and a link 17' connecting it with a weighted dog 18 that is adapted to engage the teeth of the ratchet wheel 7 and having a pivotal connection with the frame 14 by means of a link 19. This link and the dog 18 will form a toggle and lock the ratchet wheel against backward movement. I also provide a bracket 20 pivoted at 21 and carrying a dog 22 which engages the teeth of the ratchet wheel. A pin 23 is pivoted in the bracket 20 and passes loosely through an opening in the dog 22 and is provided at its threaded outer end with a thumb nut 24, between which and the end of the dog a compression spring 25 is arranged. If for any reason the blower is operated too rapidly, the resistance to the movement of the blower will be transmitted through the ratchet wheel to the dog 22, causing this dog to oscillate and put the spring 25 under compression and when the dog 18 is operated to slip over a tooth of the ratchet wheel and the compression spring 25 is released, the movement of the wheel to compensate for this compression will be sufficient to prevent the dog 18 from clearing the tooth and its movement will be confined to a notch between the teeth until such time as the speed of the blower has been reduced sufficiently to relieve the compression of the spring 25. When this compression is normal, the dog 18 will have a step by step movement on the teeth of the ratchet and will continue such movement as long as the speed of the blower does not exceed the desired limit.

With this apparatus I am able to swing up the operating cable and at the same time keep the blower in continuous operation and at a uniform speed. Furthermore, I dispense entirely with clutches and other connecting parts so that whenever the cable is unwound it is only necessary to grasp the crank and wind up the cable without giving any attention to the other parts. A blower operated in this way will maintain a uniform pressure in the lighting system and a steady flame at the burners.

I claim as my invention:—

1. The combination, with a driven shaft, of a driving shaft and a drum mounted thereon having a cable and weight, and means for revolving said drum to wind said cable, a ratchet wheel secured to said driven shaft, operative connections between said ratchet wheel and said driving shaft to continue the revolution of said driven shaft when said drum and driving shaft are revolved in the opposite direction, means for normally locking said ratchet wheel against backward movement, said means rendering said operative connections temporarily inoperative when the load on the driven shaft exceeds a predetermined amount.

2. The combination, with a revolving drum and a cable and weight therefor, of a driven shaft having a driving connection with said drum, a ratchet wheel secured on said driven shaft, an operating shaft geared to said drum and having a crank, a dog connected with said operating shaft and adapted to engage the teeth of said ratchet wheel, means for normally locking said ratchet wheel against backward movement, said means allowing a limited backward movement of said ratchet wheel to render said operating dog temporarily inoperative when the load on the driven shaft exceeds a predetermined amount.

3. The combination, with a drum and a cable and weight therefor, of a driven shaft, a ratchet wheel secured thereon and operatively connected with said drum, an operating shaft geared to said drum and having an operating crank, a crank arm mounted on said operating shaft, a dog carried thereby and adapted to engage the teeth of said ratchet wheel, a link having a fixed pivot at one end and pivotally connected at its other end with said crank arm, said link and dog forming a toggle joint and normally locking said ratchet wheel, and means for rendering said dog temporarily inoperative when the load on the driven shaft exceeds a predetermined speed.

4. The combination, with a drum and a cable and weight therefor, of a driven shaft, a ratchet mounted on said driven shaft, pawls carried by said ratchet and adapted to engage teeth provided on the hub of said drum for transmitting the movement of said drum in one direction to said driven shaft, said means allowing the free revolution of said drum in the other direction, means for winding said drum, including an operating dog adapted to engage the teeth of said ratchet wheel, a second dog engaging the teeth of said ratchet wheel, a spring arranged to be put under tension by backward movement of said ratchet wheel, whereby an excess of back pressure on said driven shaft will render said ratchet operating dog temporarily inoperative.

In witness whereof, I have hereunto set my hand this 14th day of February, 1912.

FRANK PFEIFER.

Witnesses:
GENEVIEVE E. SORENSEN,
EDWARD A. PAUL.

---

Copies of this patent may be obtained for five cents each, by addressing the "Commissioner of Patents, Washington, D. C."